UNITED STATES PATENT OFFICE.

JAMES A. WHEELER, OF OSWEGO, NEW YORK.

PROCESS OF MOLDING FIBROUS PULP.

SPECIFICATION forming part of Letters Patent No. 539,928, dated May 28, 1895.

Application filed March 24, 1894. Serial No. 504,995. (No specimens.)

*To all whom it may concern:*

Be it known that I, JAMES A. WHEELER, of Oswego, in the county of Oswego, in the State of New York, have invented new and useful Improvements in Processes of Molding Fibrous Pulp, of which the following is a full, clear, and exact description.

This invention is designed to be used in the manufacture of bath-tubs, burial-caskets and other articles including flat tile or boards from fibrous pulp, more especially from wood-pulp, except in articles where it is necessary to make them fire-proof, in which case I use asbestos fiber.

The object of the invention is to impart to the molded article greater rigidity and hardness and render it impervious to water and in certain cases to make it fire-proof; and to that end the invention consists in the successive steps of the treatment of the pulp preparatory to and during the process of molding the same into the required shape and subsequent treatment of the molded article, as hereinafter described, and specifically set forth in the claim.

In practicing my invention I proceed as follows: I take any suitable fibrous pulp, preferably wood-pulp which I moisten with clear water, preferably hot water at or near boiling point which has the advantage of melting or dissolving such articles as may be used to combine together the different materials hereinafter described, also of facilitating the drying of the article itself. With this water I moisten the pulp so as to render it pasty and while in this condition I thoroughly mix therewith sodium silicate or silicate of potash known as soluble glass, to make a doughy body of the compound, which I thoroughly knead and which when molded and exposed to the air or artificial heat possesses the property of being gradually converted into a gelatinous mass which finally solidifies.

When it is desirable to make the article water-proof, pulverized burnt lime may be combined with the above doughy body which solidifies quite rapidly to a mass as hard as stone and generally capable of resisting chemical action.

Where the molded article is to be white or of colors produced from white, (as it is a well known fact that any color pigment or dye added to white produces such shade of color or tints as may be desired,) I mix with any suitable fibrous pulp moistened with water as described or with the aforesaid compound, white-lead or zinc-white or the ordinary air or water slaked quick-lime or quick-lime slaked with chloride of magnesia or calcium-chloride, which gives it a much whiter color, or whiting in such quantities as may be desired or deemed advisable to produce a white mass, which afterward forms an insoluble soap in connection with resins or gums when heated as proposed. Said resins or gums are to be in a pulverous condition when introduced into the above materials heated by water as aforesaid and they may while being formed into the desired article or after the article is formed, be subjected to additional heat sufficient to melt the resins or gums which develop into a homogeneous mass which will then harden directly when exposed to the ordinary temperature and will continue to harden into a very rigid body of a beautiful luster and is not then affected by extremely hot water, which especially adapts it for bath-tubs and analogous articles where it comes into use with alkali soaps and hot water.

I further improve the compound by adding to the fibrous pulp (treated as aforesaid), the following materials, namely: Calcined pulverized magnesite soaked in chloride of magnesia or its equivalent may be used in its stead, as for instance, oxide of calcium, oxide of barium, or other oxides, and with earthy oxide, which oxides I may soak with the chloride of the aforesaid substances either before or at the time of adding them to the compounds as stated, or I may use said chloride as a corresponding bath as hereinafter stated for the molded article.

The mixture I knead or beat up by means of a suitable implement or appliance and then mold it in the desired shape by forcing it between dies or molds prepared for the purpose. The material is allowed to set or harden in the molds or taken out and baked in a suitable kiln at a temperature of about 200° to 270° and is thereby dried and hardened to a condition which allows the article to be finished by either a cutting or an abrading or polishing tool.

Articles containing the magnesite or its equivalent as before stated may be further hardened by a solution of chloride of magnesia or other chlorides as previously stated, which may be either brushed or sprayed thereon or applied by immersing the molded article in a bath of said solution before baking the article as aforesaid.

As an additional finish to the molded article before described (with the exception of the fire-proof articles) they may be subjected to a hot bath of rosin or gum dissolved in melted paraffine which hardens quickly when exposed to the ordinary temperature without baking, giving in combination with the materials named, a hard smooth lustrous surface.

What I claim as my invention is—

The treatment of fibrous pulp in and after the process of molding the same, consisting in first moistening the pulp with water and mixing therewith sodium silicate or its described equivalent, then kneading the compound and adding thereto pulverized calcined magnesite sufficient to convert said compound into a doughy body, then mixing therewith pulverized quick-lime, then adding pulverized resins or gums, then heating and molding the mass, then drying or baking the molded article and finally subjecting the same to a bath formed of a solution of chloride of magnesia or other chlorides as hereinbefore stated.

In testimony whereof I have hereunto signed my name this 10th day of March, 1894.

JAMES A. WHEELER. [L. S.]

Witnesses:
K. BURKE,
W. H. BAKER.